US008087350B2

(12) United States Patent
Morin

(10) Patent No.: US 8,087,350 B2
(45) Date of Patent: Jan. 3, 2012

(54) PREPAYMENT DEVICE FOR DELIVERY OF FRENCH FRIES

(75) Inventor: Annick Morin, Millau (FR)

(73) Assignees: Mohamed Boualam, Mireval (FR); Laurent Bertrand, Villefranche sur Mer (FR); Stephane Peyroutet, Madrid (ES)

( * ) Notice: Subject to any disclaimer, the term of this patent is extended or adjusted under 35 U.S.C. 154(b) by 535 days.

(21) Appl. No.: 11/719,282

(22) PCT Filed: Nov. 14, 2005

(86) PCT No.: PCT/FR2005/050944

§ 371 (c)(1),
(2), (4) Date: Jul. 30, 2007

(87) PCT Pub. No.: WO2006/054016

PCT Pub. Date: May 26, 2006

(65) Prior Publication Data

US 2008/0092752 A1 Apr. 24, 2008

(30) Foreign Application Priority Data

Nov. 17, 2004 (FR) ..................................... 04 52659

(51) Int. Cl.
*G07F 9/10* (2006.01)
*B65G 59/04* (2006.01)

(52) U.S. Cl. ................ 99/356; 99/357; 99/355; 99/377; 221/211

(58) Field of Classification Search .................... 99/404, 99/326, 407, 353–357, 377; 426/241, 281, 426/438, 523
See application file for complete search history.

(56) References Cited

U.S. PATENT DOCUMENTS

| | | | | |
|---|---|---|---|---|
| 5,325,993 | A * | 7/1994 | Cooper, III | 221/211 |
| 5,346,423 | A * | 9/1994 | Caveza et al. | 446/479 |
| 6,401,600 | B1 * | 6/2002 | Schleh | 99/329 R |

FOREIGN PATENT DOCUMENTS

| | | | |
|---|---|---|---|
| DE | 20207547 | | 12/2002 |
| EP | 0636334 | | 2/1995 |
| EP | 636334 | A1 * | 2/1995 |
| FR | 2597319 | | 10/1987 |
| FR | 2673826 | | 9/1992 |
| JP | 07053046 | | 2/1995 |
| JP | 2003/104321 | | 4/2003 |
| NL | 1006811 | | 2/1999 |
| NL | 1016217 | | 3/2002 |

* cited by examiner

*Primary Examiner* — Henry Yuen
*Assistant Examiner* — Jianying Atkisson
(74) *Attorney, Agent, or Firm* — Egbert Law Offices PLLC

(57) ABSTRACT

The invention concerns a prepayment device for dispensing French fries. The pre-cooked and frozen French fries are discharged from storage, and a determined amount is weighed corresponding to one or more portions. The French fries are then received by a receiver which moves between the weighing zone, and the cooking zone, followed by conveyance of the discharged and transported cooked French fries to a container from storage. The device uses a swinging movement of the receiver, enabling the French fries to be mixed and turned ensuring that they are homogeneously cooked. An additional feature of the device is that the cooked French fries are discharged with a tilting movement about an axis towards the transport for the cooked French fries to the container.

11 Claims, 5 Drawing Sheets

PREPAYMENT DEVICE FOR DELIVERY OF FRENCH FRIES

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates to a prepayment device for dispensing French fries. This device is capable of ensuring, on the one hand, the storage of precooked and frozen French fries and, on the other hand and automatically, cooking a determined quantity of French fries before dispensing them, contained in a container, to a consumer.

The invention relates to the field of the manufacture of the automatic devices for dispensing French fries to a consumer against previous payment.

2. Description of Related Art Including Information Disclosed Under 37 CFR 1.97 and 37 CFR 1.98

There are already known a number of devices of the above-mentioned type. In particular, from EP-0,636,334, a prepayment dispenser for French fries is known, in which precooked and frozen French fries are stored before being conveyed into a container consisting of a plate edged by rims. This container is brought to the level of a cooking station for French fries where this container is shaken through a vibrating device so that the French fries move and jump on the plate, in order to ensure a homogeneous cooking.

However, in addition to the fact that this vibrating device proves far from being efficient and does not at all allow a homogeneous cooking of French fries, this vibrating device, on the one hand, requires a particular and complex installation of the French fries dispenser (fixed slides, movable slides, helical springs, . . . ) and, on the other hand, causes premature dysfunctions and degradations at the level of the dispenser because of the repeated vibrations.

Moreover, this dispenser comprises means for ensuring the discharge of cooked French fries towards a station for dispensing these French fries to the consumer. This discharge means consists of mounting the plate of the container in a retractable way. In this respect, it should be noted that this mounting has a number of drawbacks related to the retractable design of this plate as well as to the (greasy) nature of the French fries arranged on this plate. In fact, these drawbacks consist of, during the discharge of the French fries through retraction of the plate, a number of these French fries remaining clamped or hooked at the level of the plate and do not fall into said container. This causes, on the one hand, dissatisfaction of the consumer and, on the other hand, generation of bacteria that adhere to the French fries that remain on the plate and are dispensed at the next dispensing cycle.

This dispenser also comprises means for storing the containers aimed at containing French fries. These storage means have a number of drawbacks. On the one hand, these containers are stored with their mouth turned upwards, which favors the deposit of dust or the like on the bottom of such a container. The suction cup effect between the containers and the smoothness of the edges of these containers prevent suitable seizing and easy separation of a container from another one.

BRIEF SUMMARY OF THE INVENTION

The invention pretends to be capable of coping with the drawbacks of such a dispenser and consists of a number of improvements that have been made to such a device.

To this end, the present invention relates to a prepayment device for dispensing French fries, this device being in the form of a cupboard. On the one hand, at the level of which is defined a recess for receiving and dispensing to a consumer, there is a container containing cooked French fries as well as means for receiving payment means. Inside the device, the following are installed:

- means for storing, at a suitable temperature, precooked and frozen French fries;
- means for discharging these French fries from these storage means;
- means for weighing a determined quantity of French fries, coming from the discharge means and the storage means, and corresponding to one or several portions of French fries;
- means for receiving the weighed French fries coming from the weighing means;
- means for cooking the weighed French fries received by the receiving means;
- means for discharging from the receiving means the cooked French fries received by these receiving means;
- means for conveying the French fries discharged from the receiving means towards the recess for receiving and dispensing a container of French fries;
- means for ensuring a displacement of the means for receiving French fries between the weighing means, the cooking means and the conveying means;
- means for storing the containers aimed at containing French fries as well as means for dispensing these containers one by one and inside the recess;
- control means for triggering a cycle of dispensing of French fries associated with the means for receiving payment means; and
- means, in particular activated by said control means, and arranged in order to ensure the management of the carrying out of the various steps of the cycle of dispensing of French fries.

This device for dispensing French fries is characterized in that it comprises means for communicating to the means for receiving French fries a swinging motion about an axis, when these receiving means are positioned at the level of the means for cooking these French fries.

According to an additional feature, the discharge means consist of means for communicating to the means for receiving French fries a swinging motion about an axis and towards the conveying means.

According to another feature of the invention, the means for ensuring a displacement are comprised, on the one hand, of a carriage, which the means for receiving French fries are made integral with. On the other hand, this carriage is movably mounted on a guiding path. A motorized means for driving this carriage on this guiding path is between the weighing means, the cooking means and the conveying means.

An additional feature consists in that the carriage comprises means for rotationally mounting, on the latter and according to a substantially horizontal axis, means for receiving the French fries. These means for rotationally mounting are comprised, on the one hand, of bearings defined at the level of the carriage and, on the other hand, of shaft lengths defined at the level of the receiving means and designed capable of cooperating with said bearings.

In fact, the means for communicating to the means for receiving the French fries a swinging motion consist of a first driving means capable of cooperating with a first shaft length defined at the level of the means for receiving the French fries for driving the latter according to a swinging motion, this in the cooking position of these receiving means.

The means for communicating a swinging motion to the means for receiving the French fries consist of a second driving means capable of cooperating with a second shaft length defined at the level of the means for receiving the French fries, in order to drive the latter according to a swinging motion, this in the discharge position of these receiving means.

According to another feature of the invention, the means for discharging the French fries from the storage means consist of at least two rotating brushes installed at the outlet of said storage means, having an opposite direction of rotation, in order to ensure the driving of the French fries, and the rotational actuation of which is, at least partly, controlled by the weighing means.

Still another feature relates to the fact that the means for dispensing containers comprise, on the one hand, means for seizing, in particular forming a suction-cup, such a container being stored at the level of the storage means and, on the other hand, means for turning such a container upside down in a filling position.

The advantages of this invention reside in that the means for receiving the French fries can adopt a swinging motion when these receiving means are located at the level of the means for cooking the French fries. Such a swinging motion allows mixing and turning the French fries upside down, thus authorizing a homogeneous cooking of the latter.

Other aims and advantages of this invention will become clear when reading the following description related to embodiments which are given only by way of illustrative and non-restrictive examples.

BRIEF DESCRIPTION OF THE SEVERAL VIEWS OF THE DRAWINGS

This description will be better understood when referring to the attached drawings.

DETAILED DESCRIPTION OF THE INVENTION

The present invention relates to the field of the manufacture of prepayment devices 1 for dispensing French fries.

Figure 1:
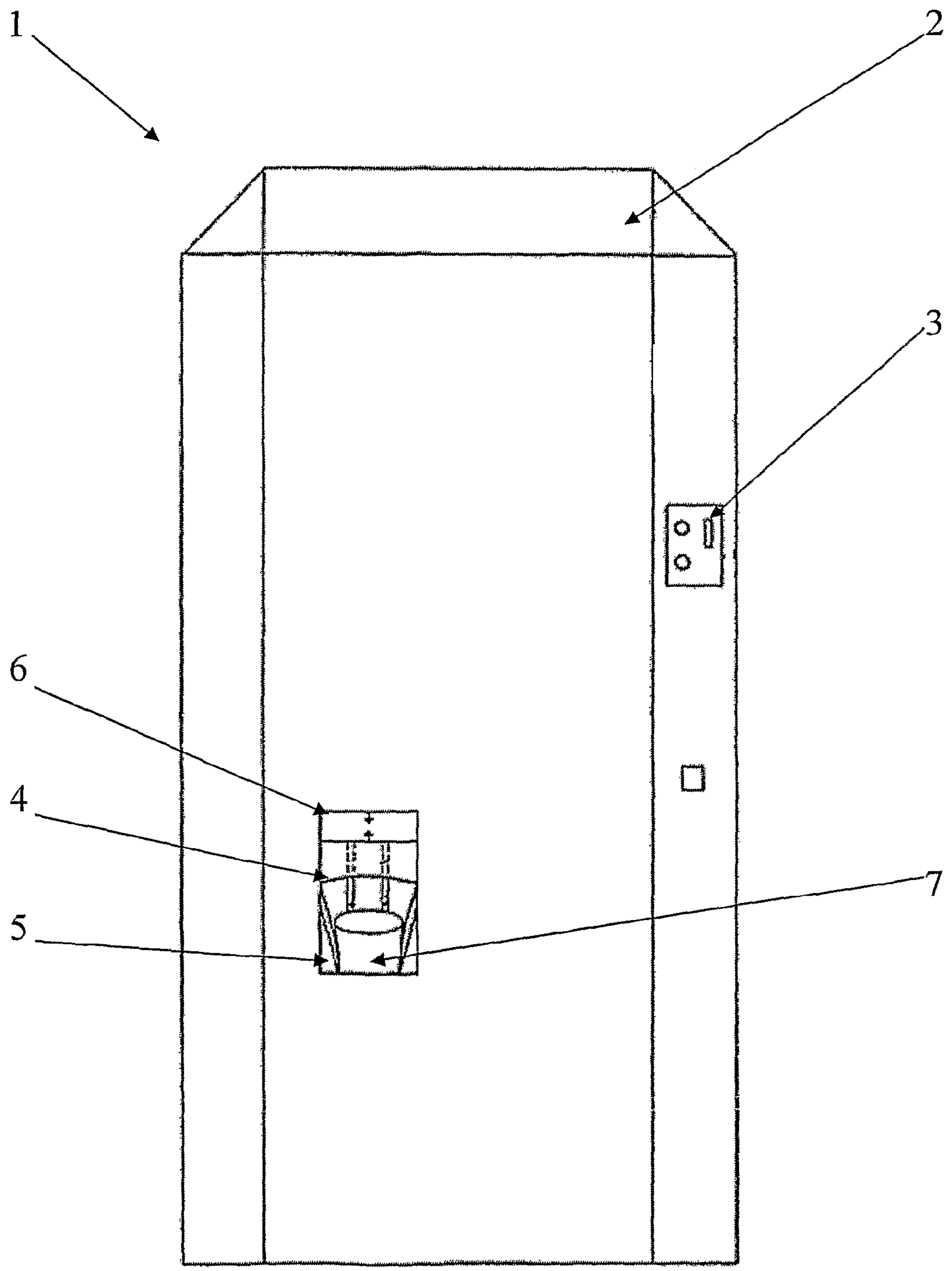
FIG. 1 is a perspective view of the front face of a prepayment device for dispensing French fries according to the invention.

In FIG. 1, the front face of such a device 1 is shown, which is, usually and externally, in the form of a cupboard 2, in particular a metal and generally parallelepiped-shaped cupboard.

The front face of this device 1 comprises means 3 for receiving payment means (not shown). Such receiving means 3 can be in the form of at least a slot for inserting, as the case may be, coins and/or a payment card (magnetic, chip card or the like) forming said payment means.

As can be seen in this same FIG. 1, there is defined, at the level of the front face of this cupboard 2, an opening 4 providing access to a recess 5, namely likely to be closed by a (for example, vertically movable) trap door 6. This recess 5 is designed, on the one hand, for receiving a container 7 (for example a tray, a goblet or the like), namely waiting for containing cooked French fries and, on the other hand, for dispensing to a consumer such a container 7 containing cooked French fries.

In the further description, reference will be made, more particularly and except as otherwise specified, to arrangements and technical means, which the device 1 internally comprises.

In this respect, it should be noted that this device 1 comprises, internally, means 8 for storing (empty) containers 7 aimed at containing French fries as well as means 9 for dispensing these containers 7 one by one and in said recess 5.

According to the invention, the means 9 for dispensing these containers 7 comprise, on the one hand, means for seizing 10 such a container 7 stored at the level of storage means 8 and, on the other hand, means for turning 11 such a container 7 upside down designed capable of bringing the latter 7, after it has been seized by the seizing means 10, into a filling position (mouth of the container turned upwards) in which the seizing means 10 releases said container 7.

Figure 5:
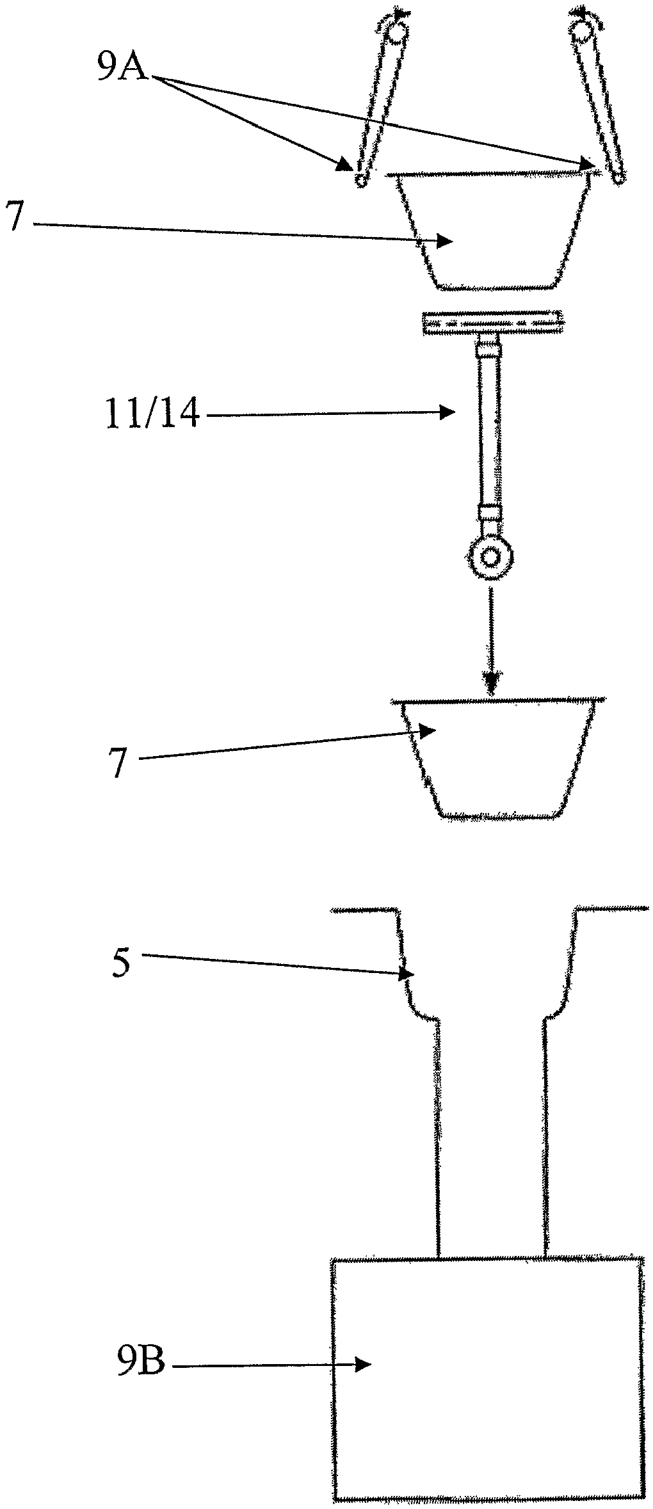
FIG. 5 is a detailed side schematic view of the means for dispensing containers shown in FIG. 4.

In this respect, it should be noted that the seizing means 10 releases said container 7 at the level of means for receiving 9A this container 7. The means for dispensing 9 such a container 7, which means (9A) adopts the shape of, comprise a pair of parallel rods, The rims of a tray forming such a container 7 rest on the parallel rods. The containers 7 are designed capable of being separated (namely through rotation about an axis as can be seen in FIG. 5), in order to release such a container 7.

In fact, this container 7 is released vertically with respect to the recess 5, which is supplemented with sucking means 9B, which obliges such a container 7 to integrate into this recess 5 and to remain in place there at least during its filling with French fries.

In this respect, it should be noted that this sucking means 9B can also be designed capable of sucking eventual French fries fallen outside a container 7 during the phase of filling of the latter 1.

As regards said seizing means 10, it consists of means forming a suction cup 12 designed capable of cooperating with the bottom 13 of a container 7 and associated to said means for turning upside down 11.

Such means forming a suction cup 12 preferably consists of a silicone suction cup connected to a vacuum pump.

As regards said means for turning upside down 11, it consists of an arm 14 mounted in a hinged way at the level of its one end 15 and receiving, at the level of its other end 16, said means for seizing 10 a container 7.

In fact, these dispensing means 9 are, at least partly, designed capable of seizing a container 7 stored at the level of the storage means 8 comprising, on the one hand, means 17 for receiving piled-up containers 7 so that their bottoms 13 are turned upwards and their mouth downwards and, on the other hand, means 18 for automatically raising the level of the receiving means 17 as the dispensing of containers 7 progresses, this so that the upper container of the pile is always at the level of the seizing means 10.

The device 1 also comprises, internally, means for storing 19, at an appropriate temperature (generally about −18° C.), precooked and frozen French fries as well as means 20 for discharging these French fries from said storage means 19 and supplementing the latter 19.

In this respect, the invention has the means 20 for discharging the French fries from the storage means 19, which consists of at least two rotating brushes 21, 21' installed at the outlet of said storage means 19 and having an opposite direction of rotation, in order to ensure the driving of the French fries.

Such rotating brushes 21, 21' turn about two preferably parallel axes, the distance between which is substantially equal to the diameter of such a brush.

Such discharge means 20 allow, on the one hand, gathering the French fries at the outlet of the storage means 19 and, on the other hand, retaining some French fries in the tangle of the bristles of the brushes 21, 21' and inside the storage means 19 at an adequate deep-freeze temperature.

The device 1 comprises, in addition, means 22 arranged so as to ensure weighing a determined quantity of pre-determined weight of French fries coming from the discharge means 20 and the storage means 19, and corresponding to one or several portions of French fries.

Such weighing means 22 adopt, for example, the form of two cups, articulated according to two parallel axes, and mounted on two parallel arms integral with an electronic weighing system.

In this respect, it should be noted that, according to the invention, the actuation in rotation of the rotating brushes 21, 21' is, at least partly, controlled by the weighing means 22. In fact, the device 1 can be designed so that, when the weight of French fries detected by these weighing means 22 corresponds to a portion of French fries, these weighing means 22 control the stoppage of the rotation of the brushes 21, 21' and prevent the dispensing of new French fries by the discharge means 20.

It should be noted that the storage means 19, the discharge means 20 and the weighing means 22 can be enclosed in a heat-insulated and cooled chamber so as to maintain, inside this chamber, an adequate temperature (usually about −18° C.) for preserving said French fries in a deep-frozen state.

In this respect, it should be noted that this insulated chamber can be closed with a closing system designed, on the one hand, to open an opening this chamber comprises vertically with respect to the weighing means during the discharge of a determined quantity of French fries from this chamber and, on the other hand, to close this opening again after such a discharge of French fries.

In fact, this closing system comprises two sliding carriages on common slides. One of the carriages bears a trap door through hinged arms. The other carriage is motorized and pushes the first carriage through a spring connected to the hinged arms of the trap door, which is, by gravity, in the lower position. When the first carriage arrives at the end of travel through a stop, the motorized carriage continues its travel, actuating the hinged arms, which apply the trap door against the opening of the chamber. The second carriage is locked at the end of travel, ensuring a constant pushing of the trap door through the spring.

The device 1 also comprises means 23 for receiving the weighed French fries coming from the weighing means 22. Such receiving means 23 are preferably in the form of a basket or the like, comprising a bottom, upright edges as well as an opening allowing the entering and the leaving of the French fries.

Figure 2:
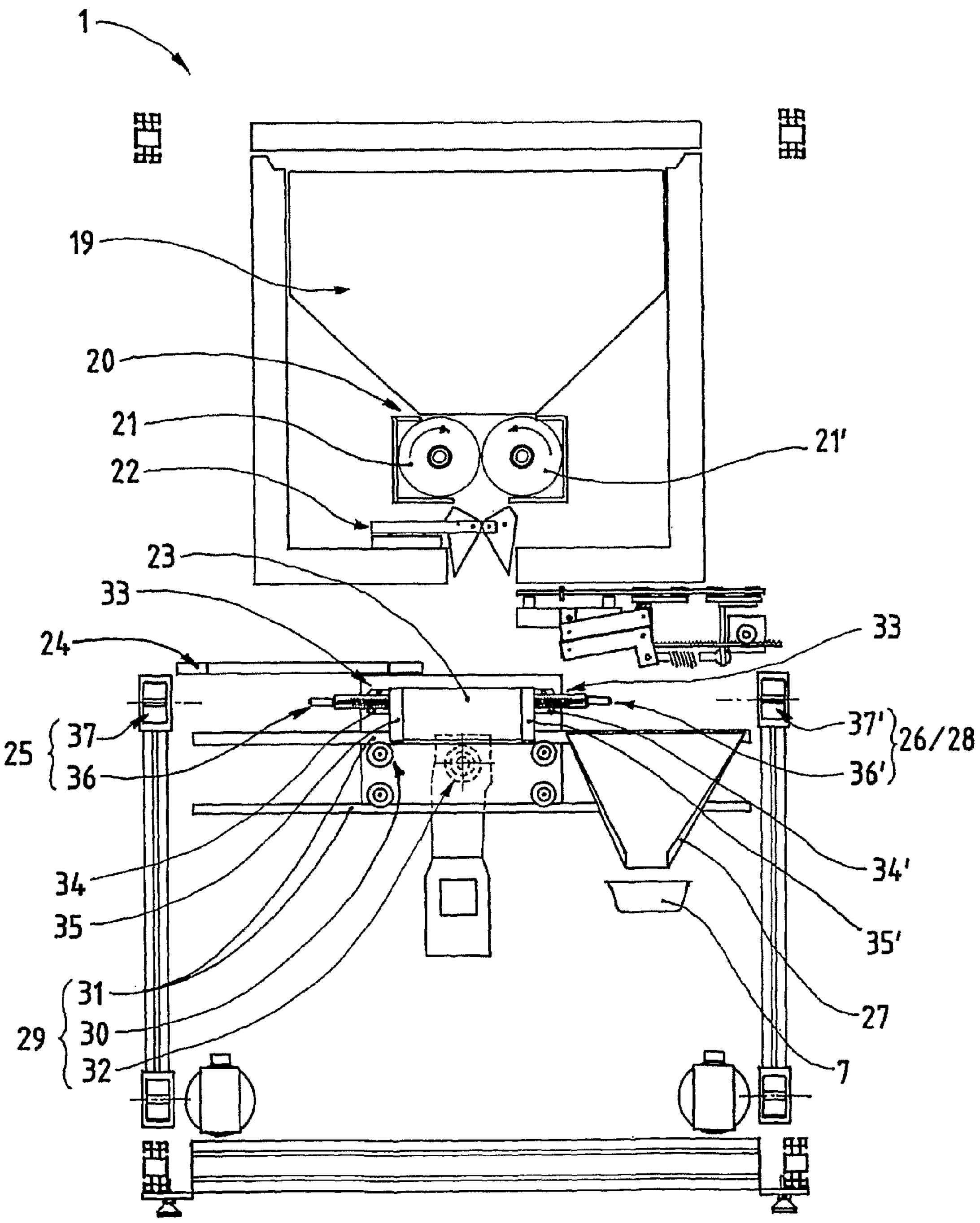
FIG. 2 is a front view of part of the internal installation of the technical means the device according to the invention internally comprises
Figure 3:
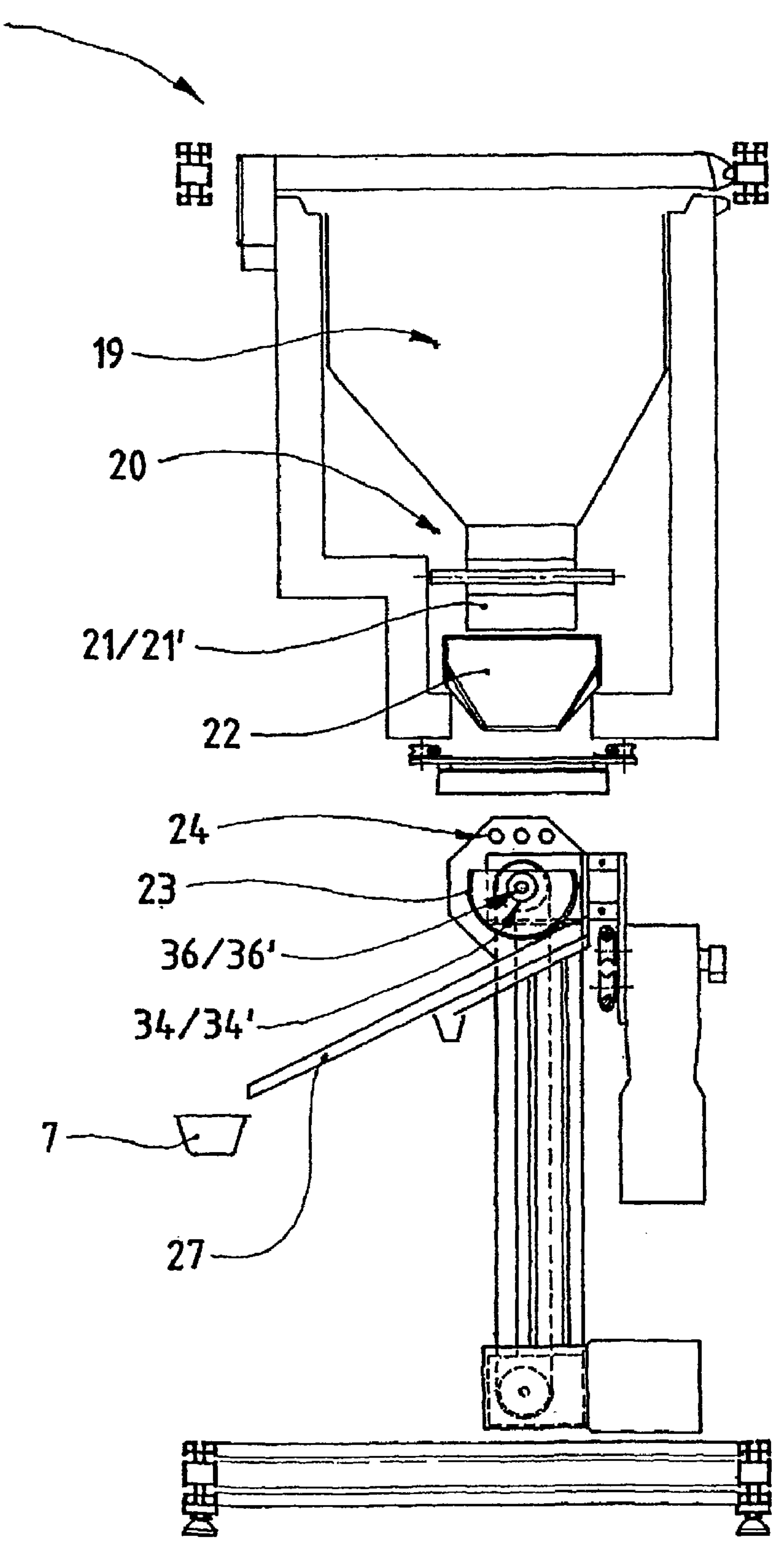
FIG. 3 is a side view of part of the internal installation of the technical means the device according to the invention internally comprises.
Figure 4:
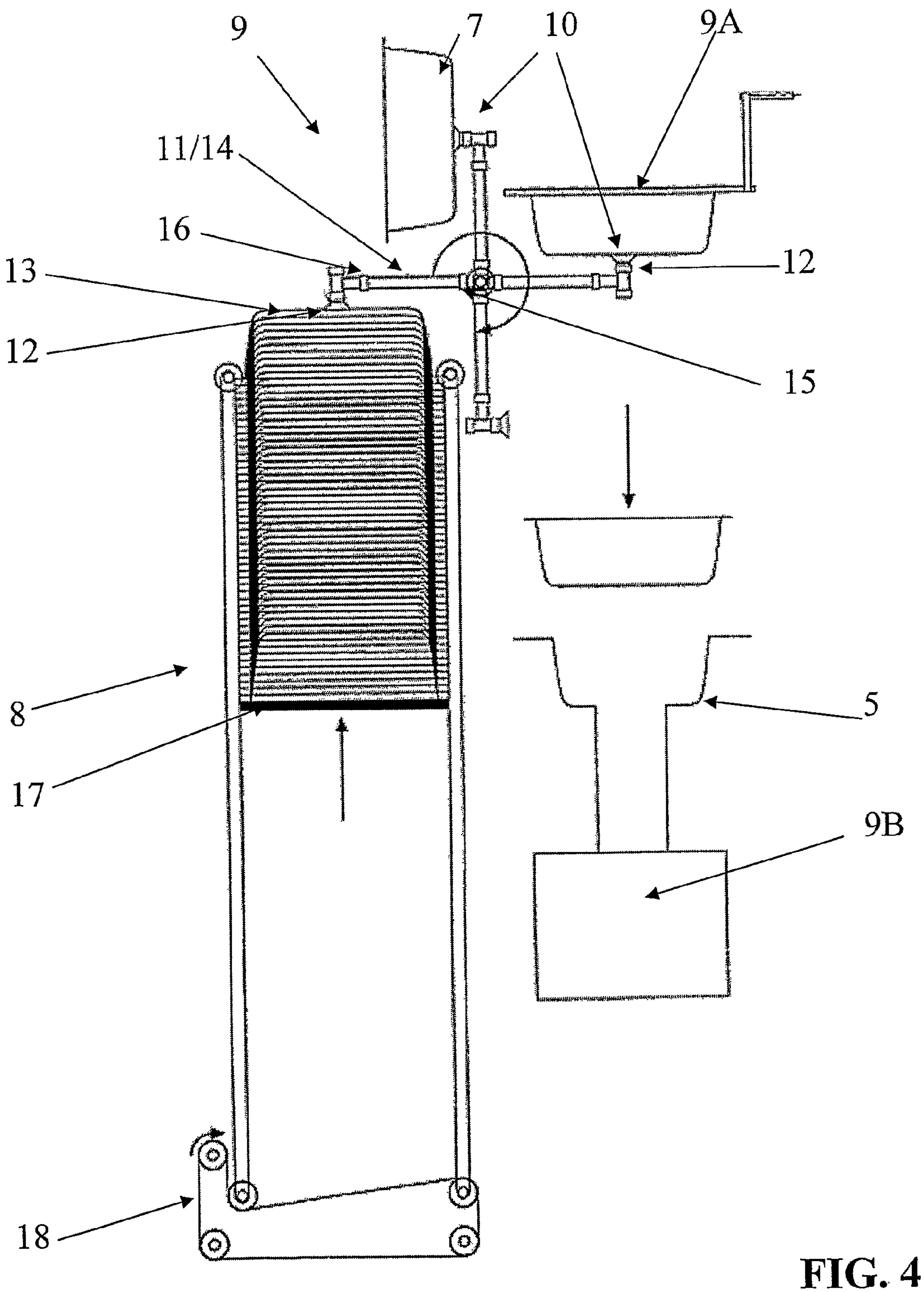
FIG. 4 is a detailed front view of the means for storing and dispensing containers, this in various positions of the latter.

In fact and as can be seen in FIGS. 2 and 3, such receiving means 23 preferably adopt the form of a cylinder, closed at its end, and truncated according to a plane cutting parallel to an axis of rotation described more in detail in the following description.

Such receiving means 23 can namely be defined, at least partly, by a grid, an openwork metal sheet or the like.

This device 1 also comprises means 24 for cooking the weighed French fries received by the receiving means 23. Such cooking means 24 are, at least partly, in the form of one or several resistors, one or several lamps, namely infra-red, halogen lamps or the like, under which are positioned the means 23 for receiving the French fries.

According to the invention, the device 1 comprises means 25 for communicating a swinging motion about an axis (in particular a substantially horizontal axis) to the means 23 for receiving the French fries, this when these receiving means 23 are positioned at the level of the means 24 for cooking these French fries.

Such means 25 for communicating a swinging motion allow ensuring turning upside down and mixing the French fries 4 inside the means 23 for receiving these French fries, which advantageously authorizes a homogeneous cooking of the latter.

Another feature consists in that the device 1 comprises means for managing this swinging motion (namely the speed and/or the amplitude of this motion) namely as a function of the weight, the quantity and/or the shape of the French fries contained in the receiving means 23.

Moreover, the device 1 comprises, on the one hand, means 26 for discharging from the receiving means 23 the cooked French fries received by these receiving means 23 and, on the other hand, means 27 for conveying the French fries discharged from the receiving means 23 towards the recess 5 for receiving and dispensing a container 7 with French fries. Such conveying means 27 can consist of a channel or the like ending into the recess 5 and above the mouth of a container 7.

According to the invention, the discharge means 26 consist of means 28 for communicating to the means 23 for receiving the French fries a swinging motion about an axis (in particularly a substantially horizontal axis) and towards the conveying means 27, this in order to proceed to emptying said receiving means 23.

Another feature of the invention consists in that the device 1 comprises means 29 for ensuring a displacement of the means 23 for receiving the French fries between the weighing means 22, the cooking means 24 and the conveying means 27.

According to the invention, these means 29 for ensuring a displacement of the receiving means 23 are comprised, on the one hand, of a carriage 30, which said means 23 for receiving the French fries are made integral with, on the other hand, of a guiding path 31 on which this carriage 30 is movably mounted, still on the other hand, of motorized means 32 for driving this carriage 30 on this guiding path 31, this between the weighing means 22, the cooking means 24 and the conveying means 27.

In fact, the device 1 is designed so that this carriage 30 adopts a translation motion between these various means 22, 24 and 27. To this end and according to a preferred embodiment of the invention, the guiding path 31 preferably consists of at least two rods on which said carriage 30 is slidably mounted.

According to another feature of the invention, the carriage 30 comprises means 33 for rotationally mounting on this carriage 30 and according to a substantially horizontal axis means 23 for receiving the French fries.

These means 33 for rotationally mounting are comprised, on the one hand, of bearings 34, 34' defined at the level of the carriage 30, in particular at the level of supporting side plates 35, 35' such a carriage 30 comprises on both sides (and in particular at the level of its ends). In particular, these supporting side plates 35, 35' are slidably mounted on the rods of the guiding path 31.

On the other hand, these means 33 for rotationally mounting consist of shaft lengths 36, 36' defined at the level of the receiving means 23 (in particular on both sides of these receiving means 23, namely at the level of each end of the latter 23) and designed capable of cooperating with said bearings 34, 34'.

In this respect, it should be noted that the means 25 for communicating a swinging motion to the means 23 for receiving the French fries consist of first driving means 37 capable of cooperating with a first shaft length 36 defined at the level of these receiving means 23 (in particular at the level of a first end of these receiving means 23). Such a cooperation is ensured in order to drive this first shaft length 36 according to a swinging motion and, hence, in order to drive the receiving means 23 according to a swinging motion, this in the cooking position of the latter 23.

As regards the means 28 designed capable of communicating a swinging motion 20 to the receiving means 23, the latter 28 consist of second driving means 37' capable of cooperating with a second shaft length 36' defined at the level of the means 23 for receiving the French fries (in particular at the level of a second end of these receiving means 23, opposite the one comprising the first shaft length 36). Such a cooperation is ensured in order to drive according to a swinging motion this second shaft length 36' and, hence, in order to drive according to a swinging motion these receiving means 23, this in the discharge position of the latter 23.

Another feature consists in that the device 1 also comprises means for providing to the consumer at least a small bag containing, each one and namely at the consumer's choice, a dose of a condiment (ketchup, mustard, salt, pepper, mayonnaise or the like).

The device 1 also comprises means, associated with the means for receiving 3 payment means, and designed to ensure the control of the triggering of a cycle of dispensing French fries.

This device 1 comprises, in addition, means, namely activated by said control means, and arranged so as to ensure the management of the carrying out of the various steps of the cycle of dispensing French fries.

The operation of device 1 according to the invention is now is described.

After inserting payment means into said receiving means and when the appropriate sum is inserted or debited, a cycle of dispensing of French fries is triggered, this under the impulse of the control means of said device 1 and as associated with the receiving means 3.

Such a cycle of dispensing of French fries then consists of ensuring the discharge, through said discharge means 20, a determined quantity of French fries contained in the storage means 19. Such discharge is ensured towards the weighing means 22, which consist, for example, of a tilting tray subjected to means forming a counterweight and arranged to bring back said tray into its filling position after discharging a determined quantity of French fries.

Once weighed, the French fries are conveyed into the receiving means 23, which are then moved towards the cooking means 24 at the level of which a swinging motion is communicated to these receiving means 23.

After cooking of the French fries, the receiving means 23 are moved towards the conveying means 27 at the level of which a swinging motion is communicated to these receiving means 23, this in order to discharge the cooked French fries from these receiving means 23.

The French fries then fall into a container 7 arranged in the recess 5 and previously delivered by the dispensing means 9.

After filling of the container, the consumer can actuate the trap door 6 and have access to the recess 5, this through said opening 4 the device 1 comprises.

The cycle of dispensing French fries is then completed.

Although the invention has been described in connection with a particular embodiment, it is clearly understood that it is in no way limited thereto and that various modifications of shapes, materials and combinations of these various elements can be made, without therefore departing from the scope and spirit of the invention.

I claim:

1. An apparatus for providing French fries to a consumer, the apparatus comprising:

a cupboard having a recess for receiving and dispensing a container containing cooked French fries to the consumer, said cupboard having a means for receiving a payment;

a means of storing precooked and frozen French fries in said cupboard;

a first means for discharging the precooked and frozen French fries from the means for storing;

a means for weighing a desired quantity of the discharged French fries;

a basket suitable for receiving the weighed French fries from said weighing means, said basket being pivotally mounted in said cupboard about a horizontal axis, said basket having a shaft extend outwardly therefrom along said horizontal axis, said basket having a non-retractable bottom;

a means for cooking the received French fries from the means for weighing by way of the means for receiving;

a second means for discharging the cooked French fries from the means for receiving;

a means for conveying the discharged and cooked French fries toward said recess;

a means for displacing the means for receiving and the means for cooking and the means for conveying;

a means for storing containers that will contain the discharged and cooked French fries;

a means for dispensing the containers one by one from the means for storing containers adjacent and inside said recess;

a means for triggering a cycle of providing the discharged and cooked French fries cooperative with said means for receiving payment;

a means for managing the cycle of providing the discharged and cooked French fries so as to carry out the steps of the cycle; and a driver connected to said shaft of said basket so as to cause said basket to swing about said horizontal axis when said basket is positioned beneath said means for cooking, said shaft rotatably connected to said driver such that said driver swings the basket about said horizontal axis as to mix the French fries inside said basket and to turn said basket upside-down, said horizontal axis being generally parallel to a direction of moving the basket between the means for dispensing and the means for cooking.

2. The apparatus of claim 1, wherein said second means for discharging comprising a means for swinging the basket toward said means for conveying.

3. The apparatus of claim 1, said means for displacing comprising a carriage connected to said basket, said carriage having a guided path, said means for displacing further comprising a motor suitable for driving said carriage along said guided path, said guided path extending between said means for weighing and said means for cooking and said means for conveying.

4. The apparatus of claim 3, said basket rotatally connected to said carriage by bearings positioned around said shaft.

5. The apparatus of claim 4, said driver swinging said basket about said horizontal axis when said basket interacts with said means for cooking.

6. The apparatus of claim 1, said basket having another shaft extending therefrom at said horizontal axis, the apparatus further comprising:

another driver cooperative with said another shaft so as to swing said basket about said horizontal axis when said basket interacts with said second means for discharging.

7. The portable charging device of claim 1, said first means for discharging having two rotating brushes positioned at an outlet of said means for storing, said two rotating brushes having opposite directions of rotation.

8. The apparatus of claim 1, said means for dispensing containers comprising:

a means for grasping the container stored in said means for storing; and a means for turning the container upside-down to a filling position.

9. The apparatus of claim 8, said means for grasping comprising:

a suction cup cooperative with a bottom of the container.

10. The apparatus of claim 8, said means for turning comprising:

an arm hingedly mounted at one end thereof, said means for grasping being at an opposite end of said arm.

11. The apparatus of claim 8, said means for storing comprising:

a means for receiving piled-up containers in which the containers have bottoms facing upwardly and months facing downwardly; and a means for automatically raising said basket as the dispensing of containers progresses, said piled-up containers having a top container adjacent said means for grasping.

* * * * *